(12) United States Patent
Dolub

(10) Patent No.: US 8,015,949 B2
(45) Date of Patent: Sep. 13, 2011

(54) DEVICE AND METHOD FOR CATCHING EXCREMENT

(76) Inventor: Carlos Alberto Dolub, Jerusalem (IL)

( * ) Notice: Subject to any disclaimer, the term of this patent is extended or adjusted under 35 U.S.C. 154(b) by 233 days.

(21) Appl. No.: 11/721,829

(22) PCT Filed: Dec. 16, 2005

(86) PCT No.: PCT/IL2005/001353
§ 371 (c)(1), (2), (4) Date: Jun. 15, 2007

(87) PCT Pub. No.: WO2006/064506
PCT Pub. Date: Jun. 22, 2006

(65) Prior Publication Data
US 2009/0120378 A1    May 14, 2009

Related U.S. Application Data

(60) Provisional application No. 60/636,413, filed on Dec. 16, 2004.

(51) Int. Cl.
*A01K 23/00* (2006.01)
(52) U.S. Cl. ....................................................... 119/868
(58) Field of Classification Search .................. 119/868, 119/65–68; 294/1.3, 1.4, 1.5
See application file for complete search history.

(56) References Cited

U.S. PATENT DOCUMENTS

| | | | | |
|---|---|---|---|---|
| 694,807 | A * | 3/1902 | Vanderburg | 222/466 |
| 718,915 | A * | 1/1903 | Oooper | 119/868 |
| 2,519,743 | A * | 8/1950 | Cruise | 119/869 |
| 3,090,356 | A * | 5/1963 | Andrisani | 119/868 |
| 3,656,459 | A * | 4/1972 | Missud | 119/868 |
| 4,146,260 | A | 3/1979 | Carrington | |
| 4,269,148 | A | 5/1981 | Holley-Donawa | |
| 4,444,152 | A | 4/1984 | Berardo | |
| 4,502,417 | A * | 3/1985 | Jenkins | 119/868 |
| 4,969,419 | A * | 11/1990 | Fong | 119/868 |
| 4,972,982 | A * | 11/1990 | Harbour | 224/270 |
| 5,315,960 | A | 5/1994 | Lamp | |
| 5,386,801 | A | 2/1995 | Chinn et al. | |
| 5,386,802 | A | 2/1995 | Hang-Fu | |
| 5,813,369 | A * | 9/1998 | Fujinaga | 119/868 |
| 5,819,691 | A * | 10/1998 | Lavi et al. | 119/868 |
| 6,394,041 | B1 | 5/2002 | Katz | |
| 6,722,319 | B1 * | 4/2004 | Chiu | 119/868 |
| 6,837,187 | B2 * | 1/2005 | Berardo | 119/792 |
| 6,941,897 | B1 * | 9/2005 | Rosales | 119/868 |
| 2005/0022753 | A1 * | 2/2005 | Nakamura | 119/868 |
| 2005/0224015 | A1 * | 10/2005 | Gamache | 119/868 |

* cited by examiner

*Primary Examiner* — Joshua J Michener
*Assistant Examiner* — Justin Benedik
(74) *Attorney, Agent, or Firm* — Lowe Hauptman Ham & Berner LLP

(57) ABSTRACT

Excrement catching device for a quadruped is disclosed, comprising a harness and a receptacle-holder connected to the harness, wherein the connection between the harness and the receptacle holder is configured to respond to the gravitational force acting on the receptacle-holder by allowing movement of the receptacle-holder between a loosen neutral position when the quadruped stands or walks and an excrement-catching position when the quadruped pose being its customary position to defecate. Excrement catching method is disclosed accordingly, comprising configuring a device to be responsive to gravitational force by taking an operative position for catching excrement automatically when the quadruped takes a particular pose.

21 Claims, 16 Drawing Sheets

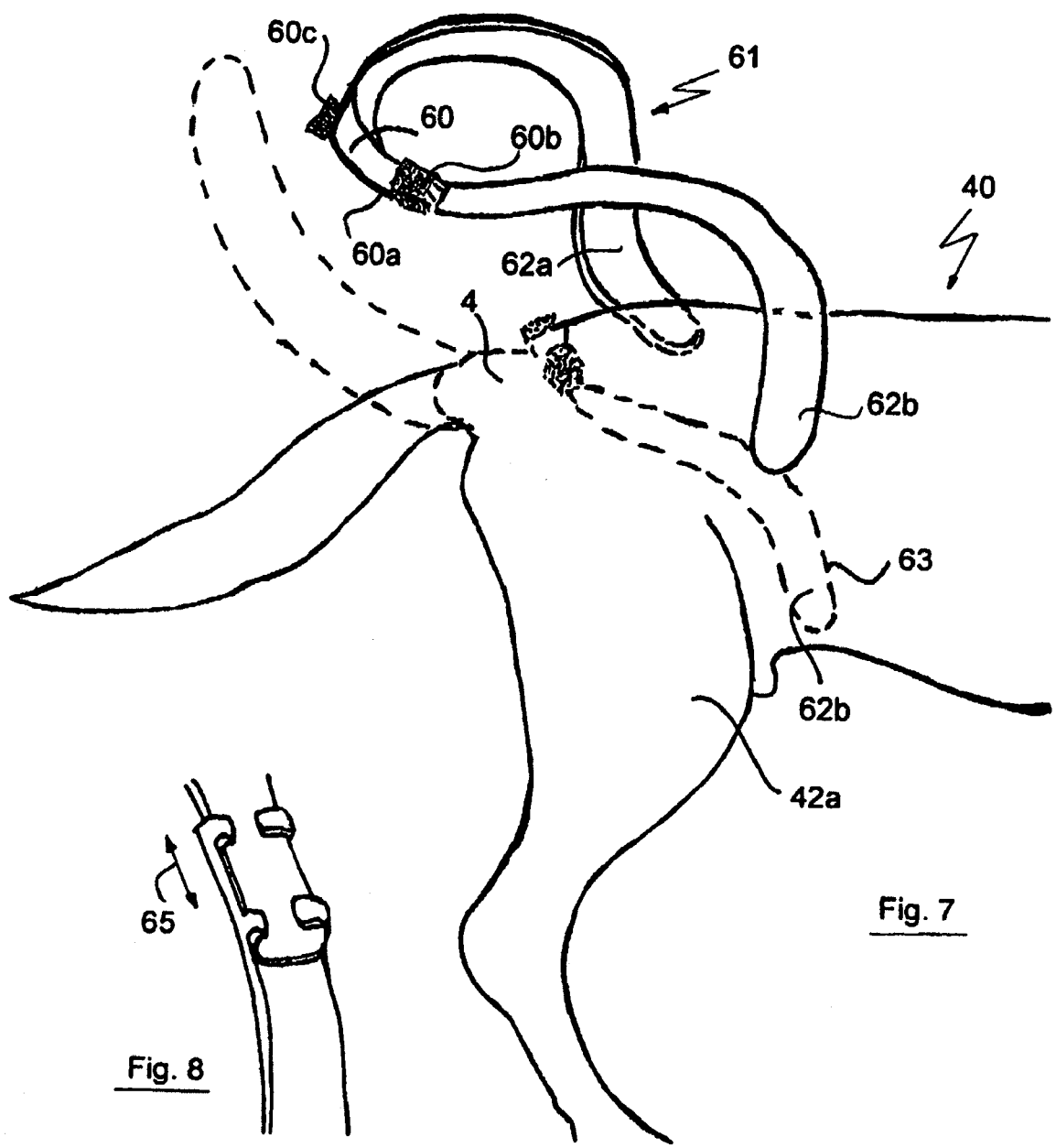

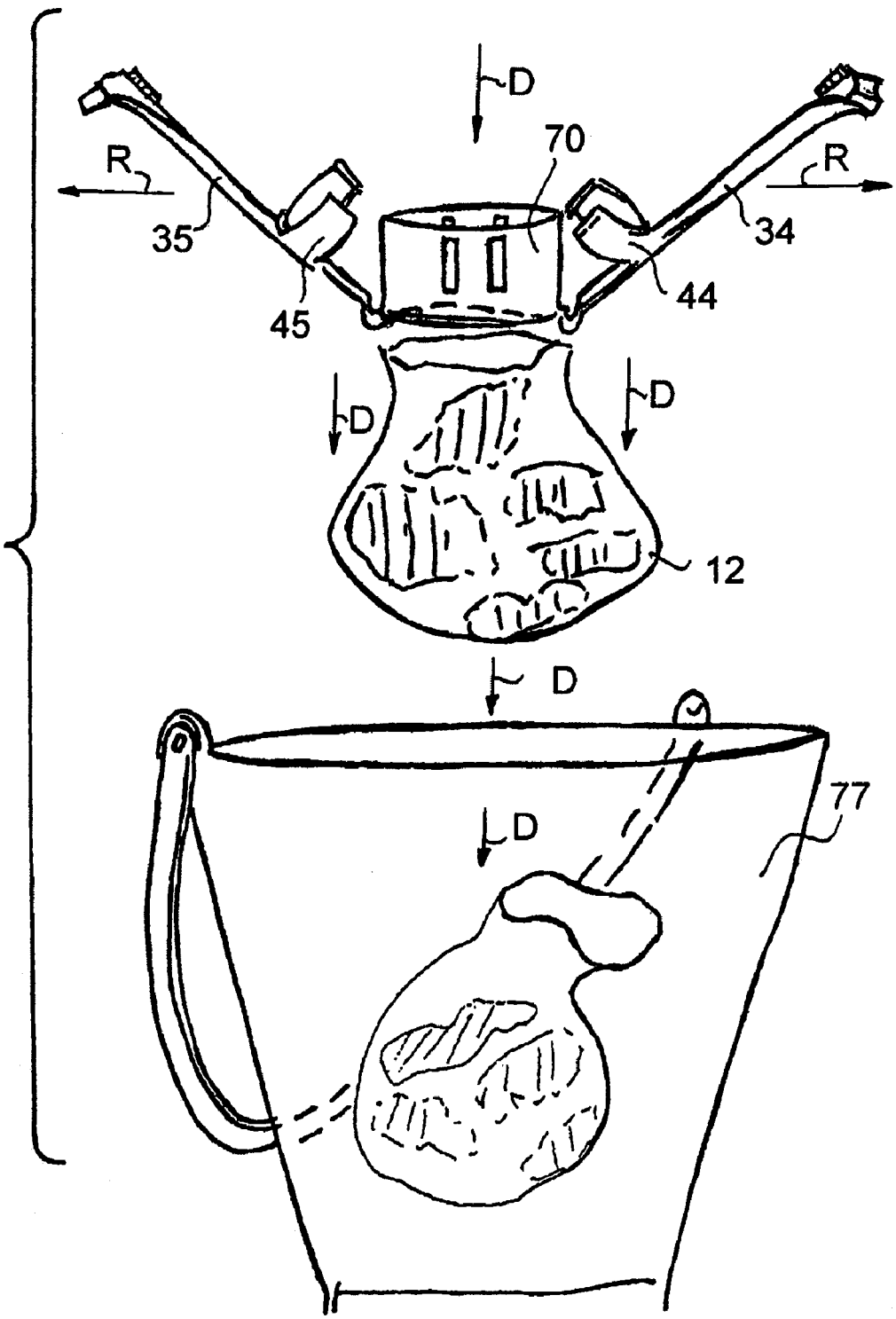

DEVICE AND METHOD FOR CATCHING EXCREMENT

FIELD OF THE INVENTION

This invention relates to the field of devices and methods for catching excrement of quadruped.

BACKGROUND OF THE INVENTION

It is commonly accepted that fouling streets and parks, and even private gardens, with dog or other animal excrement is both unhygienic and unpleasant. The majority of devices available to keep public areas clean of animal excrement are of the type that cleans up after the excrement has been deposited. This can be an unpleasant task and is never entirely effective: inevitably some traces of excrement will be left after even the most careful attempt to scrape up the deposit.

An obvious solution to this problem is to catch the excrement in a receptacle before it reaches the ground. Devices that attempt to do this are can broadly be divided into two types: those fixed in position on the animal and those free of the animal.

An example of the former type is U.S. Pat. No. 4,146,260 which discloses a lash-holder holding a plastic throw-away bag under the pat. The bag is removably secured to a bent tube attached to a handle having a leash latch pivoting thereon. The disadvantage with this device, and with other devices which are not fixed in position on the animal, is that the person responsible for the animal needs to hold it in the correct position themselves, requiring them to pay constant and careful attention. It also means that the animal can not be allowed to run free.

An example to the latter type is U.S. Pat. No. 5,315,960. This discloses an apparatus for collecting and disposing of animal excrement that has an elastic harness assembly attachably secured to the rear portion of the animal, and an excrement container cooperating with, and removable from, the harness assembly. The disadvantage of this particular device is that the straps that hold it in place about the tail and haunches of the animal, also constricts the animal's movements and are likely to be uncomfortable due to the pressure they exert on the animal.

U.S. Pat. No. 4,969,419 discloses an appliance for collecting animal in which a harness is fitted on the trunk of a dog for holding a collector in position across the rear of the dog. The harness in this device again engages the legs of the animal, constricting its movements, and further rests on the animal's tail, causing discomfort to the tail and preventing it from moving the tail freely.

U.S. Pat. No. 4,269,148 discloses an apparatus for collecting animal excrement for disposal thereof, and comprises a harness that fits over the posterior of the animal and a disposable excrement receiving bag. This device involves a strap that runs along the stomach and between the unfortunate animal's leg before attaching to a ring around the animal's tail, with the disadvantage that it causes discomfort to male and female animals alike. It also requires the animal to have a tail.

U.S. Pat. No. 6,394,041 discloses an excrement catching device for a dog wherein the dog has a tail, a rear end and a stomach portion. The disadvantage of this device is that it again requires the animal to have a tail to which to attach a strap that holds the excrement catching receptacle in place, and that the tail strap constricts the movements of the animal's tail, causing discomfort.

U.S. Pat. No. 5,386,801 discloses a device to be worn by an animal to accept feces. This device too, requires the animal to have a tail. It uses a substantially rigid curved contact member that fits adjacent to the buttocks of the animal, whose rigidity in close contact with the buttocks will cause the animal discomfort and constricts its movements.

SUMMARY OF THE INVENTION

The device of the present invention, including a harness, a receptacle-holder, and at least one connecting member for connecting between the harness and the receptacle-holder, is aimed at overcoming at least part of the above mentioned disadvantages of the currently known devices. This can be achieved by configuring the device to be responsive to the pose of the quadruped such that when the quadruped's pose changes to its customary position to defecate, the gravitational force moves the receptacle-holder to an excrement-catching position. Letting the receptacle holder to move under the influence of the gravitational force in response to the change in quadruped pose is a method allowing for catching excrement discretion without requiring a continuous presence of a receptacle's opening juxtapose the animal's anus. Therefore, differently from currently known devices, the receptacle holder of the invented device can hang loosely without worrying whether the receptacle opening is aligned with the animal's anus during the animal's general activity, since as soon as the animal takes its customary position to defecate the receptacle opening will automatically rearrange itself appropriately underneath the animal's anus, due to the gravitational force acting on the receptacle-holder.

The invented harness does not go around or between the animal's legs, thus leaves the animal's legs free. Moreover, the invented harness does not require the quadruped to have an actual tail. The receptacle-holder and the excrement-catching-receptacle it supports hang loosely from the harness through the at least one connecting member and require no contact with the animal, thus minimizing constriction, pressure and discomfort to the animal.

The present device is an excrement catching device for a quadruped, the device includes a harness and a receptacle-holder. Preferably, the receptacle holder is detachable from the harness. The harness includes a rear support that has a top portion leaning on the quadruped croup, i.e. from above the tail-bone in or near the area of the sacral vertebrae, and a pair of side portions holding a grasp in or near the quadruped flank area between the belly and the thighs of the rear legs, i.e. in front of the rear legs. According to some embodiments the rear support encircles the quadruped's body, i.e. it has an underbody portion connecting between the pair of the side portions from underneath. The underbody portion of the rear support preferably has an instant connection, e.g. a clasp, for easy attachment to and removal from the quadruped.

The receptacle-holder is configured for removeably holding a disposable receptacle for example, a plastic sack or a rigid bowl, which will catch the excrement as it fails from the quadruped. The receptacle holder may be configured for removeably holding other types of receptacles just as easily, and it should not be the scope of the invention dealing with all the acceptable types of disposable receptacles that may be used. The receptacle holder further has at least one connecting member for attaching it to the harness so that it hangs loosely from the harness, beneath the quadruped's anus, without being in a fixated contact with the anus. The at least one connecting member, e.g. a pair of straps each at a side, is configured to allow the receptacle-holder be responsive to the posture of the quadruped, so that when the quadruped pose changes to its customary position to defecate, the receptacle-holder automatically moves, due to the gravitational force acting on it, to an excrement-catching position with an opening of a receptacle aligned with the quadruped anus for receiving excrement secretion from the anus into the receptacle.

The harness, the receptacle-holder, and the receptacles can be varied in size to suite different sizes of quadrupeds, and can be manufactured in a variety of material. The harness may include instant adjusting arrangements allowing its complete adaptation to the specific dimensions of the animal using it.

To summarize up what will be further explained in more detail, the invention relates to an excrement catching device for a quadruped, comprising a harness and a receptacle-holder loosely suspended from the harness, such that when the quadruped walks the receptacle holder is dangling from behind, and when the quadruped takes its customary position to defecate the receptacle holder aligns below the quadruped's anus to a position operative for catching excrement.

According to some preferred embodiments the receptacle holder has a ring or a hollow cylindrical member for receiving disposable receptacle, a pair of semi-rings pivotally connected to said ring or hollow cylindrical member from opposite sides thereof for pivoting between a receptacle holding position when the semi-rings are adjacent the exterior of the ring or the hollow cylindrical member, and between a receptacle releasing position when the rings moves apart from the exterior of the ring or the hollow cylindrical member.

Preferably, the receptacle holder is removably connected to the rearmost portion of the harness.

The receptacle holder is connected to the rear portion of the harness by means of two bars, straps or rods constituting a pair of connecting members.

According to some embodiments the connection between the receptacle holder and the harness is by a VELCRO® type attachment.

According to yet further embodiments the connection between the receptacle holder and the harness is by hooks connected to the receptacle holder and receivable between the rear portion of the harness and the quadruped body, or within a brackets formed in the rear portion of the harness.

According to some preferred embodiments the harness constitutes a rear support in the form of a bridge configured for positioning above the tail bone, the rear support further has two flank-pieces configured to extend down the quadruped flanks just in front of the quadruped rear legs. The flank-pieces may be of adjustable contour or length.

According to yet further embodiments harness is in the form of a strap configured for positioning around the quadruped from above the tail bone and down the quadruped flanks just in front of the quadruped rear legs, and under its belly. Preferably, the strap is tensile or of adjustable length, and is provided with a buckle for instant connection or disconnection.

The receptacle holder may be connected to the harness through connecting members having adjustable length.

The invention relates also to a method for catching quadruped's excrement, comprising configuring a device for catching excrement to be responsive to the quadruped pose such that upon changing of quadruped's pose from standing or walking to its customary position to defecate an excrement catching receptacle of the device automatically changes its position from a loosen dangling position to an excrement-catching position.

BRIEF DESCRIPTION OF THE DRAWINGS

The features and advantages of the invention will be more clearly understood by reference to the accompanying drawings, which are given by way of example and illustration only, and are not intended to limit the scope of the invention. In particular, although some of the drawings show the device attached to a dog, this should not be taken to limit the application of the invention to dogs; it could equally well be attached to any quadruped.

FIG. 7 illustrates another embodiment of a harness according to the present invention.

FIG. 8 illustrates a telescopic flank-piece.

FIG. 17 illustrates disposal of a receptacle from the receptacle holder.

DETAILED DESCRIPTION OF THE DRAWINGS

Figure 1:
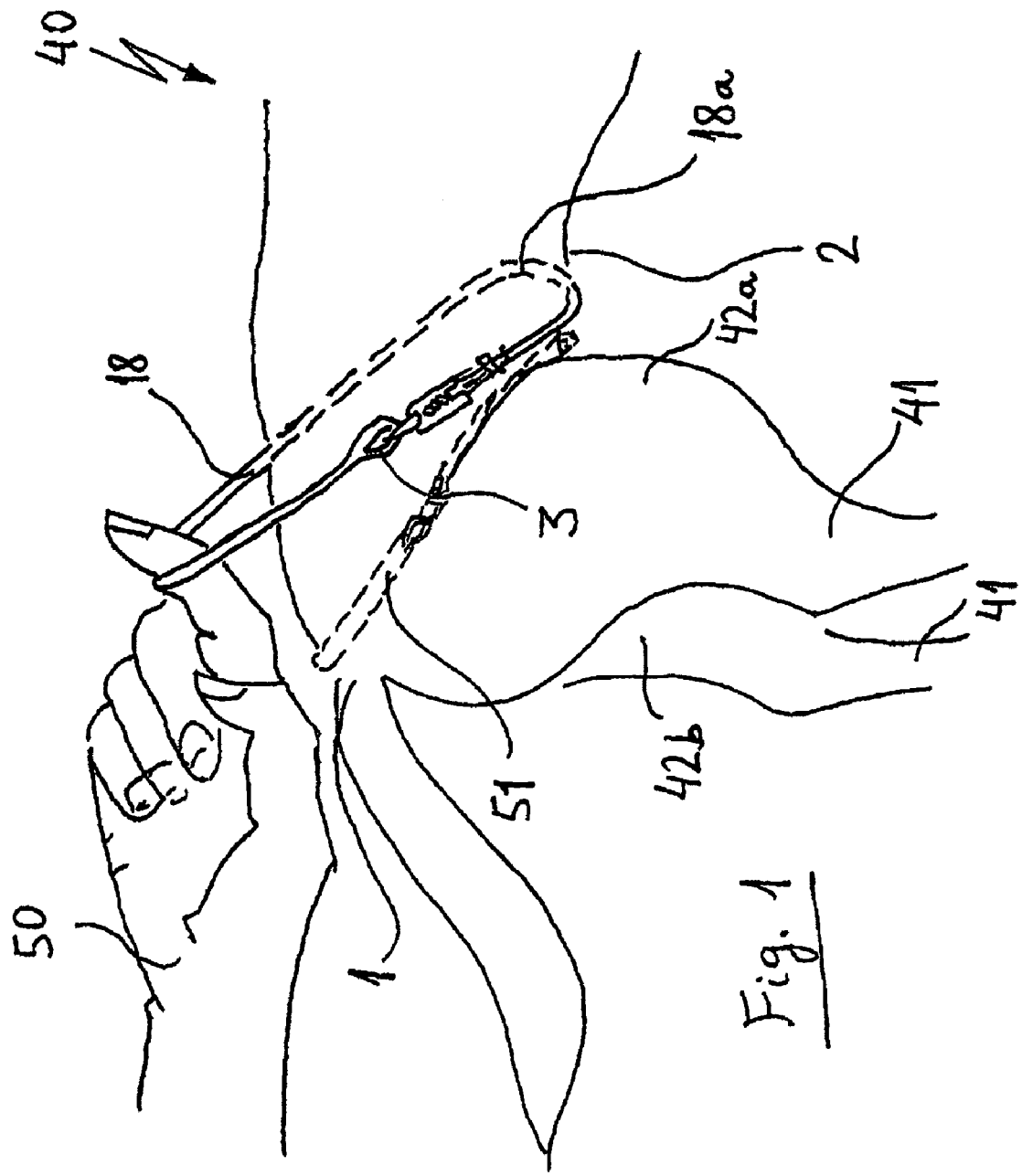
FIG. 1 illustrates the harness strap, showing its position on the quadruped.

FIG. 1 shows an exemplified embodiment of a harness according to the invention, comprising a harness strap 18 constituting a rear support, in place on a quadruped 40. in the illustrated embodiment the rear support has an underbody portion 18a, and is thus circling the quadruped 40 from just above the tail-bone 1 to between the belly 2 and the thighs 42a and 42b in front of the hind legs 41 and back to just above the tail-bone 1. A clasp 3 enables quick and easy attachment to and removal from the quadruped. In the illustrated embodiment the strap 18 is tensile, thus may be controlled by a user's hand 50 and brought to an optimal position, e.g. as demonstrated by doted line 51, even after the clasp has been closed.

Figure 2:
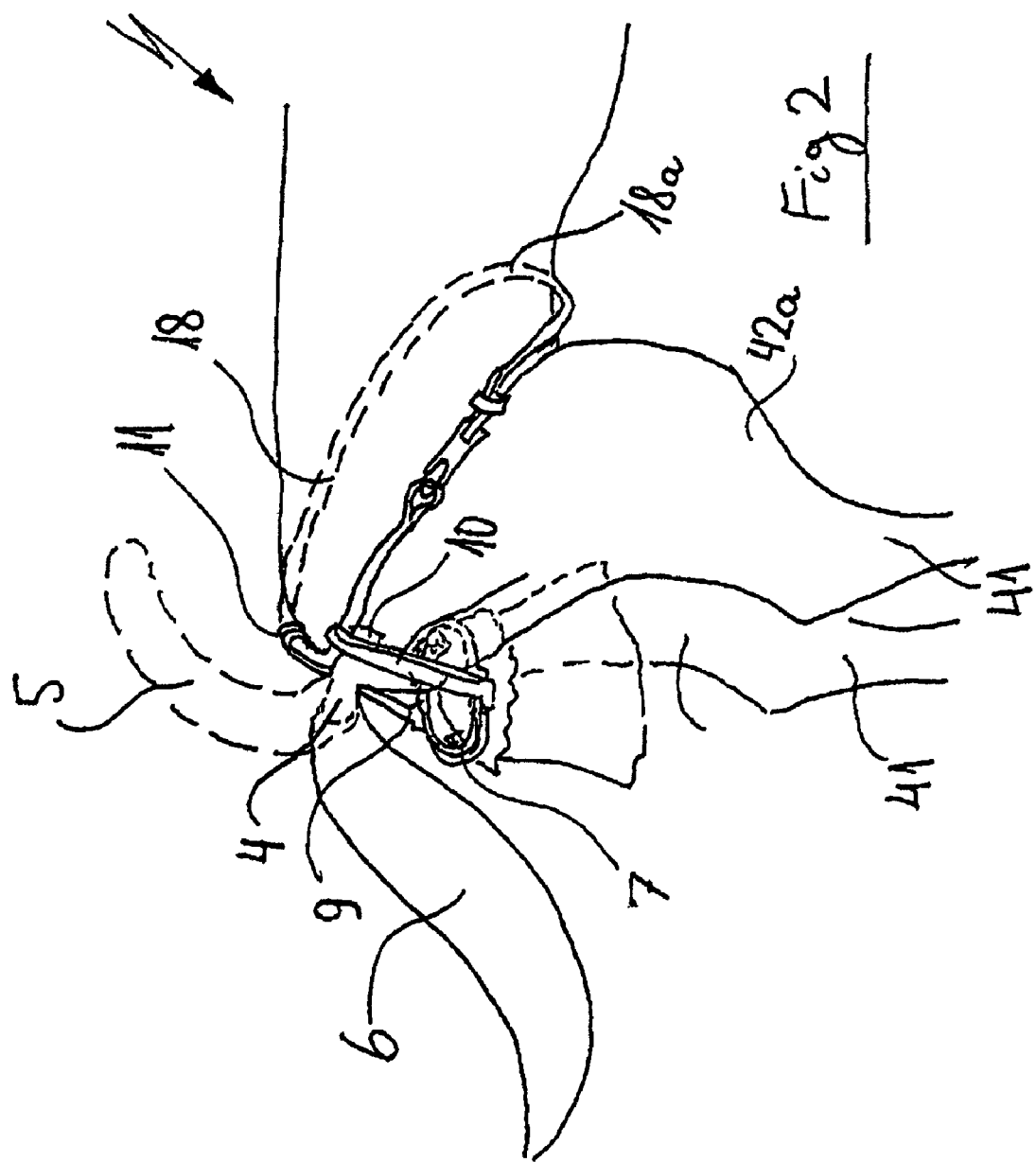
FIG. 2 illustrates the entire device in position on a quadruped walking or standing freely.

FIG. 2 illustrates that the harness strap 18 remains in position even if the quadruped 40 has no tail but only the base of the tail-bone 4 represented by a doted line, and allows the quadruped's tail to move freely up 5 and down 6. The receptacle-holder 7 hangs freely to the rear of the quadruped's hind legs 41, not in direct contact with the anus. It attaches to the harness strap 18 by means of two straps 8 & 9 constituting a pair of connecting members, which hook over the harness strap 18 on either side of the tail bone by means of hooks 10 and 11.

Figure 3:
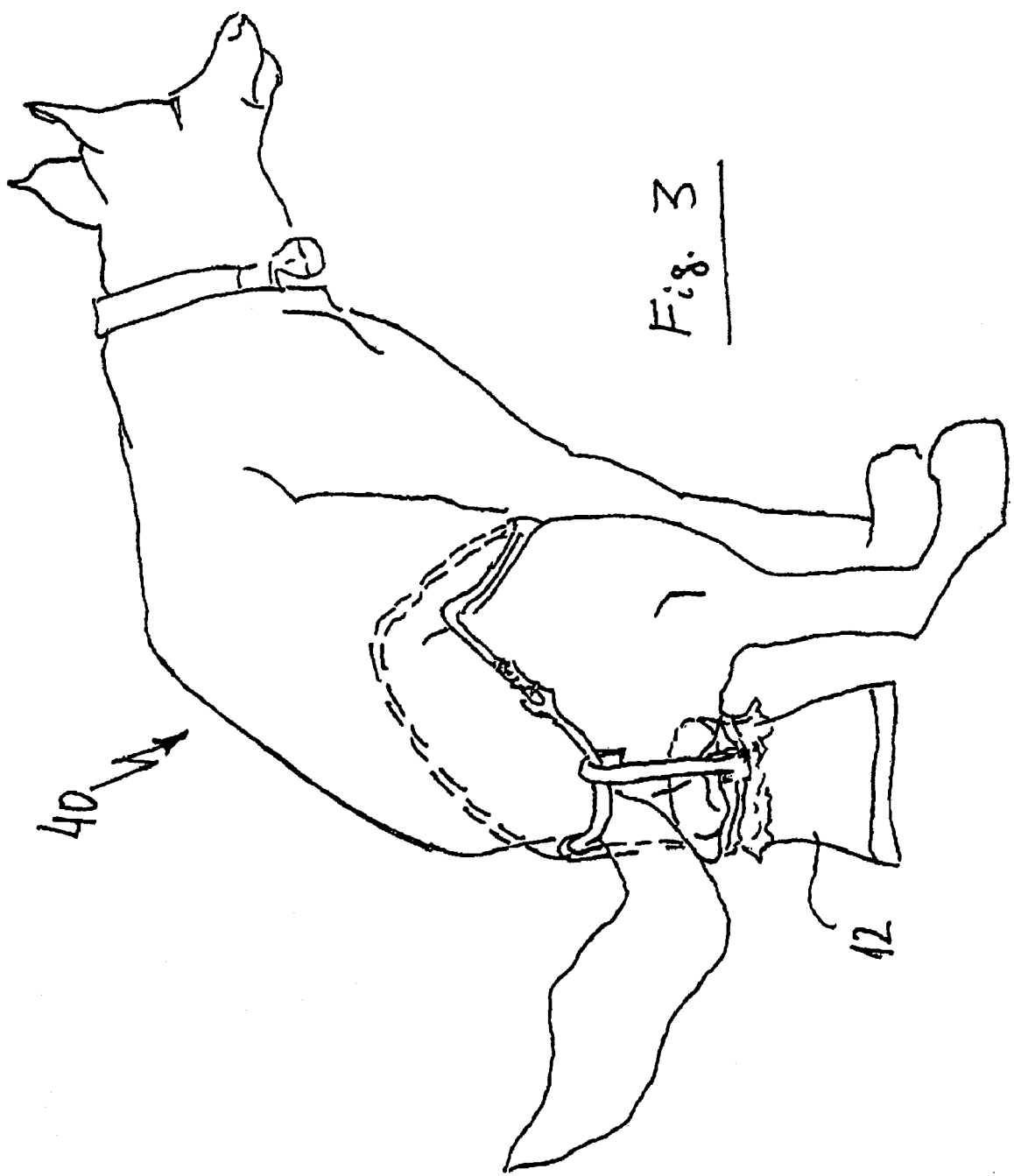
FIG. 3 illustrates the entire device on a quadruped defecating.

FIG. 3, illustrates that when the quadruped 40 takes up its customary position to defecate, the receptacle 12 is automatically becoming positioned directly underneath the anus and will catch the excrement as it falls.

Figure 4:
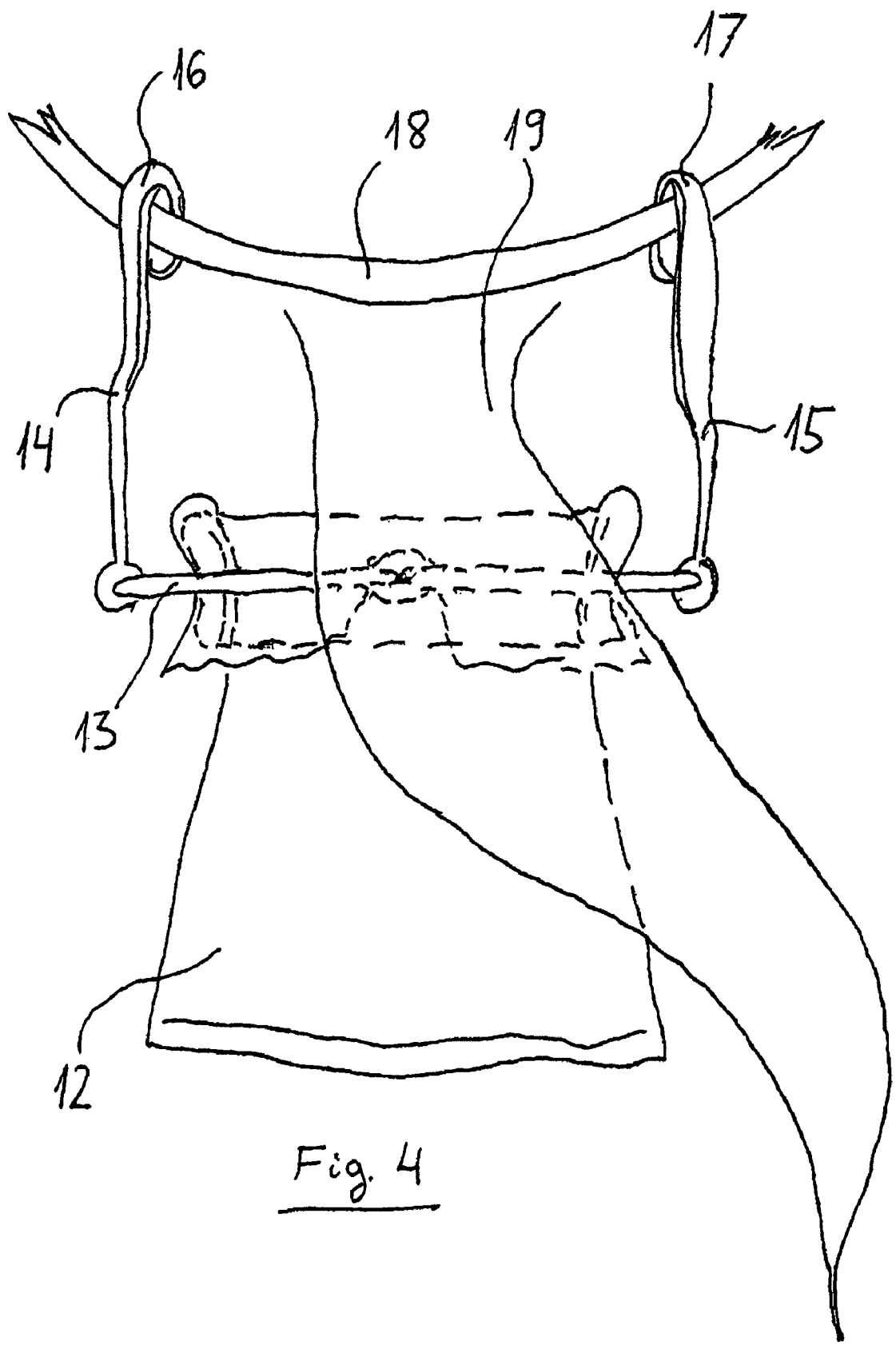
FIG. 4 illustrates the receptacle holder with a receptacle, in relation to the harness and the quadruped's tail.

FIG. 4 shows a close up of the receptacle holder 13 and two straps 14 & 15 as they hook by means of hooks 16 and 17 over the harness strap 18 on either side of the tail 19 or tail bone.

Figure 5:
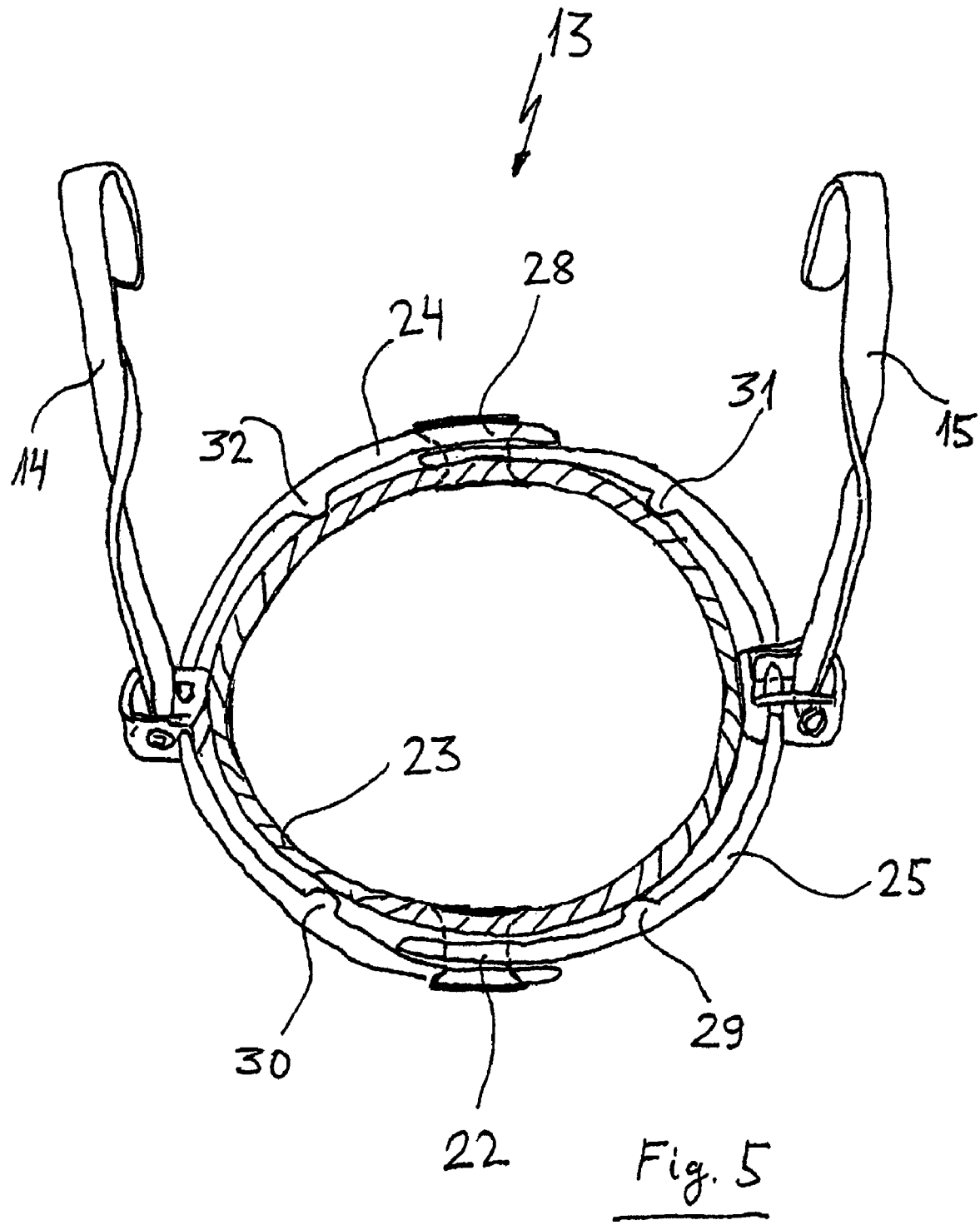
FIG. 5 gives an aerial view of a preferred embodiment of the means for attaching a receptacle to the receptacle holder.
Figure 6:
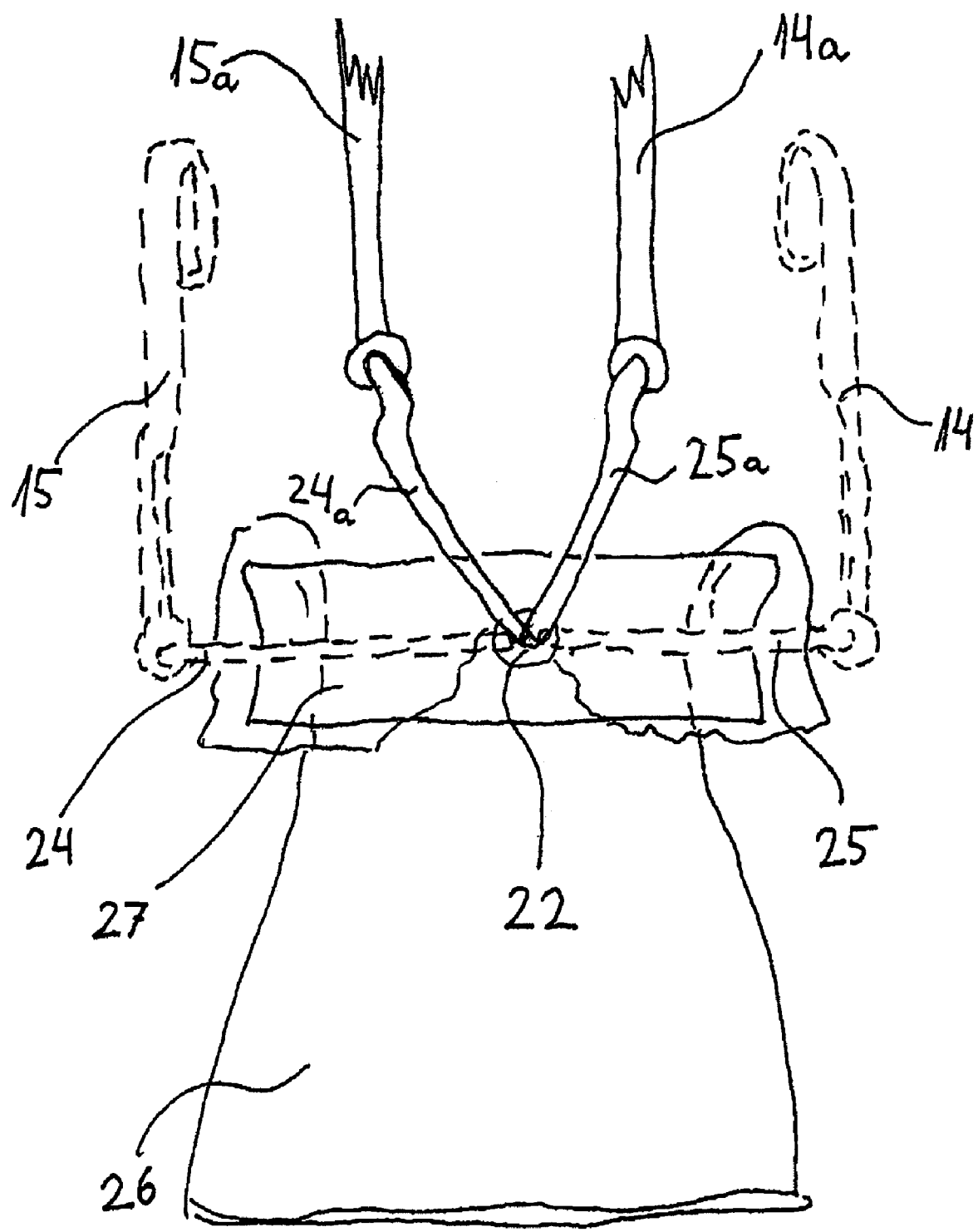
FIG. 6 gives a side view of the same preferred embodiment of the means for attaching a receptacle to the receptacle holder, with a receptacle in place.

FIGS. 5 and 6 show a preferred embodiment of the receptacle-holder 13, which consists of an inner ring 23, to which are attached two semi-circles 24 & 25 that form together an outer ring. The semi-circles 24 & 25 are attached by means of hinging pins 22 and 28 to the inner ring in such a way that they are able to pivot upwards from the inner ring, about the hinging pins 22 and 28. While they are in the upper position as indicated by 24a & 25a, the receptacle 26 (for example, a plastic bag) can be placed with its top edge 27 against the outside of the inner ring 23. When the semi-circles 24a and 25a are lowered to their lower position 24 and 25, they catch the top edge 27 of the receptacle 26 between themselves and the inner ring 23, thus holding the receptacle 26 in place. The semi-circles 24 and 25 may have protrusions 29, 30, 31, and 32, facing and stressing the inner ring 23, useful for securely grasping the receptacle, and for maintaining the semi-rings at their lower position by the pressure between the protrusions 29, 30, 31, 32 and the inner ring 23. It is understood that similar effects may be achieved by forming at least part of the protrusions on the inner ring 23, to face the semi-rings 24 and 25. It is also understood that each protrusion may have a mate such as an opposite protrusion or recess formed in the inner ring or semi-ring facing the protrusion, for increasing the grasp between the inner ring and the semi-ring.

FIG. 7 illustrates another embodiment of a harness according to the present invention. The harness comprises a rear support 61, having an upper bridge 60 and a pair of flank-pieces 62a and 62b. The flank pieces are configured to hold grasp on the quadruped's flanks as illustrated by doted line 63 which resembles the rear support 61 in place on a quadruped 40. The bridge 60 preferably having a substantially flat bottom 60a horizontally oriented and being in contact with the animal's back just above the tail-bone 4, is arched (and alternatively may be bent in another functionally equivalent contour) respective to two planes as follows: it deviates from a horizontal plane tangential to the bridge 60 towards the sides (flanks) of the animal so as to follow the animal's arched cross section, and it deviates from a vertical plane tangential to its rearmost end in a direction towards the animal's head so as to merge with the flank-pieces 62a and 62b in front of the animal's thighs 42a and 42b (the latter is not shown in this FIG.). The harness further includes a pair of VELCRO® pieces 60b and 60c, which allows for connecting the receptacle-holder to the harness 61 by means of matching VELCRO® pieces attached to the connecting members 14 and 15 (not shown in this FIG.). Connecting arrangements other than Velcro 60b and 60c, or hooks 16 and 17 of the connecting members 14 and 15 (not shown in this FIG.), may be used as well without departing from the scope of the present invention.

The harness including the bridge member 60 and the flank-pieces 62a and 62b can be formed from plastic. The gap between the flank-pieces 62a and 62b can be formed smaller than the width of the animal between its flanks, such that when positioning the harness onto the animal there will be provided a stress between the flank-pieces and the animal's flanks due to the elasticity of the plastic, useful for holding grasp of the harness on the animal. Alternatively, the harness can be made from other materials, e.g. aluminum, aluminum (or other metal) coated by plastic. The aluminum made harness allows the user to adapt the bridge member 60 and the flank-pieces 62a and 62b to the shape and dimensions of the quadruped.

In order to cover a wide range of quadruped sizes, the harness can be manufactured in several sizes, e.g. small, medium, large, extra-large, or the like. It is also possible to provide the harness with adjusting arrangement useful for adapting a harness of a given size more precisely on the specific quadruped using it. This can be achieved e.g. by configuring the free ends of the flank-pieces 62a and 62b to function telescopically as exemplified by FIG. 8 showing the a flank-piece comprising a movable sliding part which can move telescopically in either of the opposing directions indicated by the arrow 65.

The VELCRO® piece on each of the connecting members may be formed sufficiently long as to allow varying the distance between the receptacle and the harness, thus allowing a user to adjust the position of the receptacle and to optimize its location with regard to the specific quadruped wearing the device. Alternatively, several VELCRO® pieces may be placed along the length of each of the two connecting member. Another adjustment possibility is to use telescopic connecting member, formed as described in FIG. 8.

Figure 9:
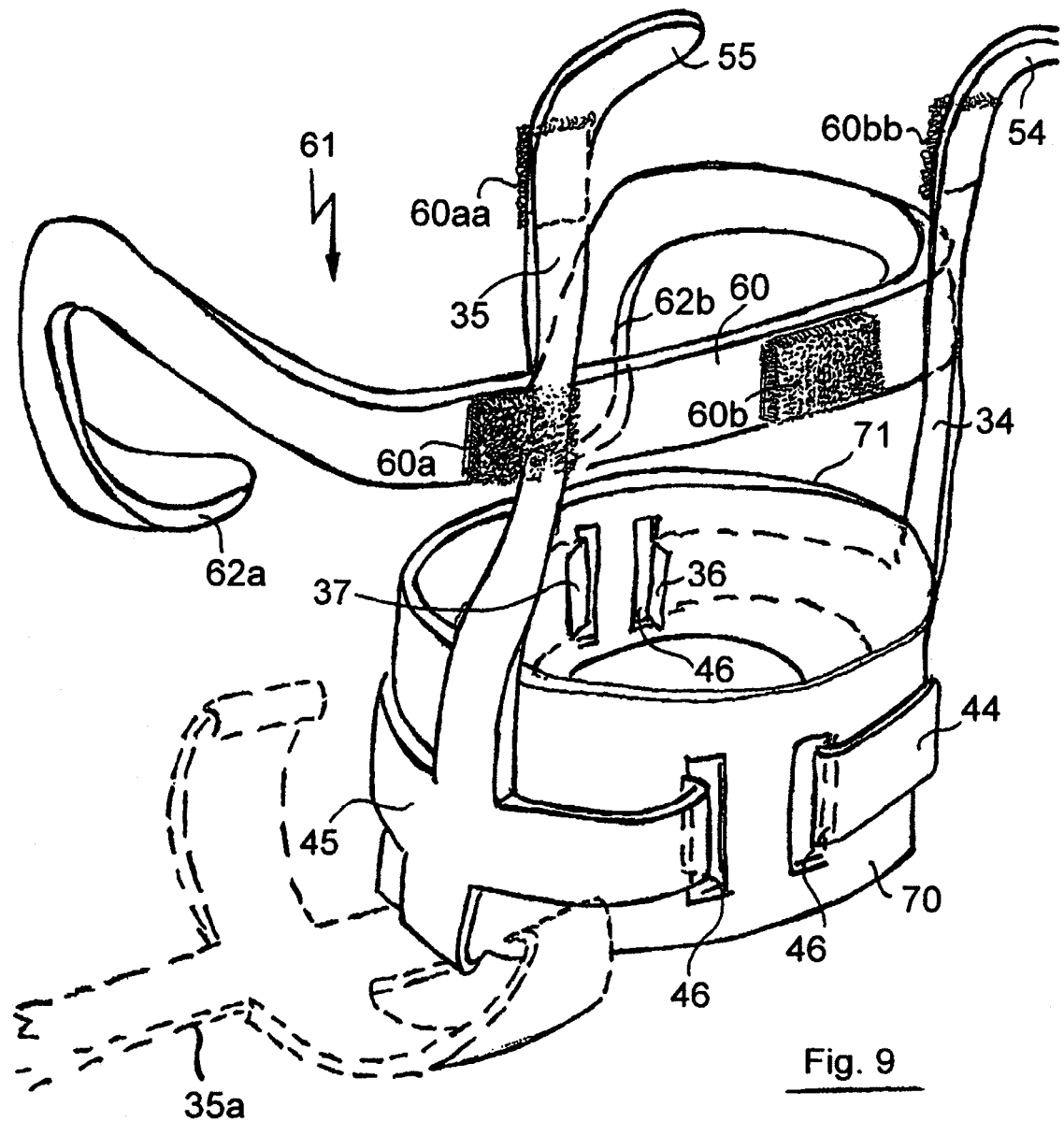
FIG. 9 illustrates from a rear side, an excrement catching device according to the embodiment of FIG. 7.

FIG. 9 illustrates an excrement catching device comprising the harness of FIG. 7, now seen from its rear side, and a receptacle-holder before connecting it to the harness. The receptacle-holder exemplified in this FIG. comprises a hollow cylindrical member 70 for holding a receptacle inserted through its hollow inner portion with a top portion of the receptacle (e.g. a disposable cup) leaning on the top edge 71 of the cylindrical member. In case receptacle is a plastic bag or the like, its top portion may be folded over the top edge of the cylindrical member, so as to enfold at least a part of the outside of the cylindrical member. Two connecting members 34 and 35 are pivotally connected, each to an opposite side of the lower end of the cylindrical member. The connecting members can thus pivot between their illustrated operative position in which they are secured to the cylindrical member by means of tongues 36, 37 located at the ends of semi-ring members 44 and 45 and clicked into grooves 46 formed in the cylindrical member, and between a temporary position illustrated by the dotted line 35a, in which the tongues are separated from their grip in the grooves and the semi-rings 44 and 45 become apart from the cylindrical member 70, to allow for easy withdrawal of the receptacle from the receptacle-holder and replacing it by a clean one. After the receptacle is in position on the cylindrical member, the connecting-members 34 and 35 are returned to their operative illustrated position, thus securing the plastic bag to the cylindrical member by grasping it between the semi-rings 44 and 45 and the exterior of the cylindrical member 70. The connecting members 34 and 35 have pieces 60aa and 60bb near their upper ends 54 and 55, to be attached to their mate VELCRO® pieces on the bridge of the harness. The upper ends 54 and 55 of the connecting member may be bent backwards, as shown, so as to serve as comfortable handles to be gripped by user's hands when disconnecting the receptacle-holder from the back support 61. The VELCRO® type connection allows for substantial changes in the angle between the connecting members and the harness, thus improve the freedom of the receptacle holder to move during movements of the quadruped, while allowing it to easily rearrange vertically from below the quadruped anus when it takes its customary position to defecate.

Figure 10:
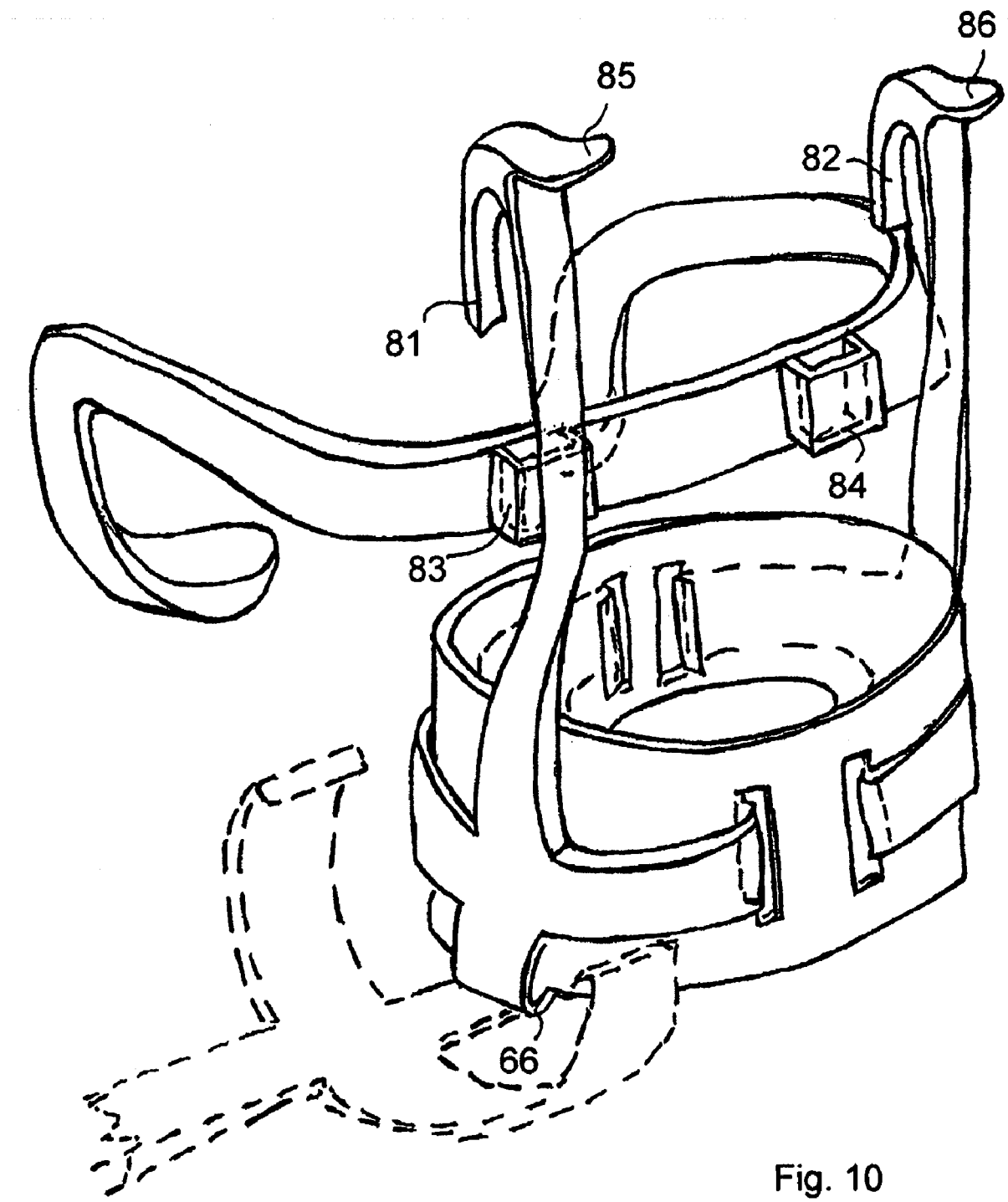
FIG. 10 illustrates an excrement catching device similar to the one illustrated by FIG. 9, but differing in the connection method between the connecting members and the harness.

FIG. 10 illustrates an excrement catching device similar to the one illustrated by FIG. 9, but differing in the connection method between the connecting members and the harness. In the embodiment of FIG. 10 the connecting members end at their top with hooks 81 and 82 (similar to the hooks 10 and 11 of the embodiment of FIG. 1, thus can be hooked to a harness of the type of FIG. 1, as well). The harness of FIG. 10 has brackets 83 and 84 for receiving the hooks 81 and 82, respectively. In the exemplified embodiments the hooks 81, 82 and the brackets 83, 84 are of a square cross section, however they can be formed round, or in any other desired shape. At the backside of the hooks 81 and 82, protrusions 85 and 86 are provided for facilitating removal of the hooks 81, 82 from the brackets 83, 84 when necessary. The hooks and the brackets are preferably designed to a non-stressed mutual connection, so as to allow easy insertion and removal of the hooks to/from the brackets, while providing sufficient freedom to the receptacle holder to rearrange in an operative vertical orientation when the quadruped takes its position to defecate.

Figure 11:
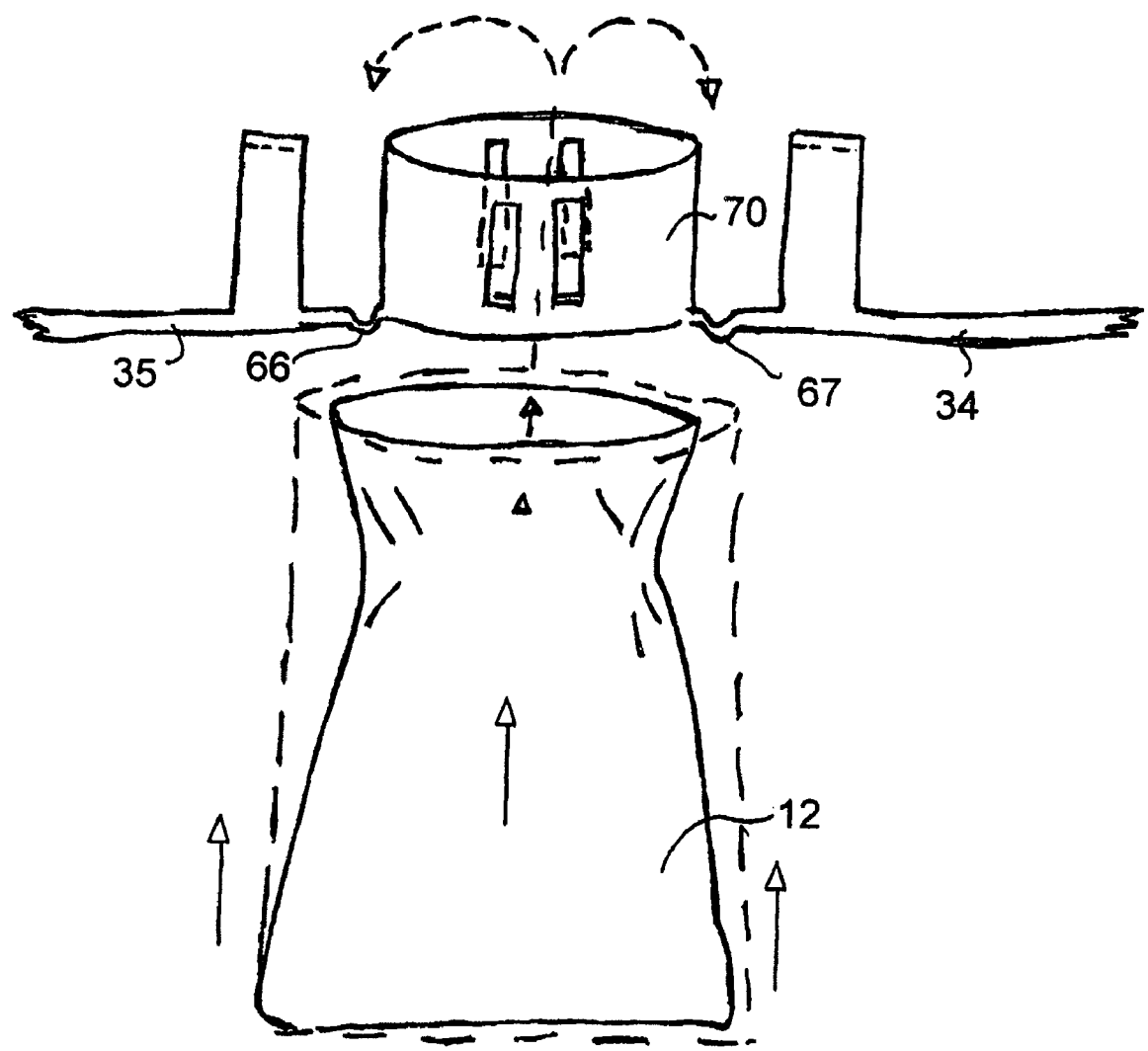
FIGS. 11-13 illustrate a partial side view of a receptacle holder in several of its operation positions.
Figure 12:
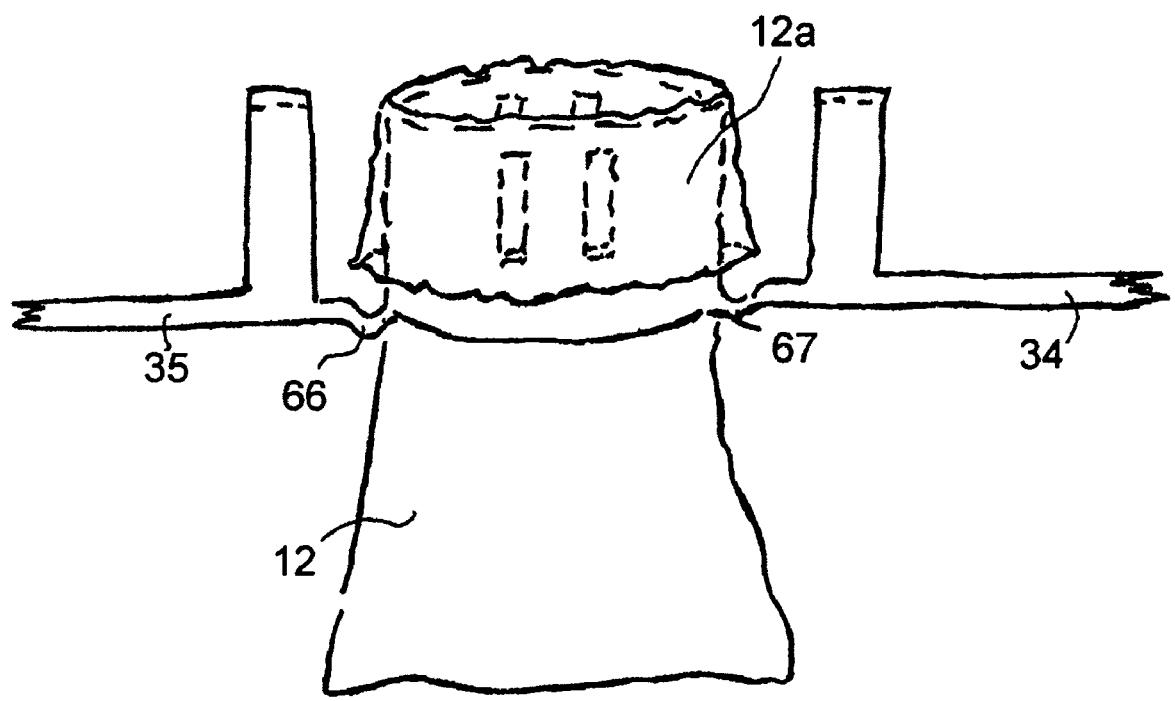
Figure 13:
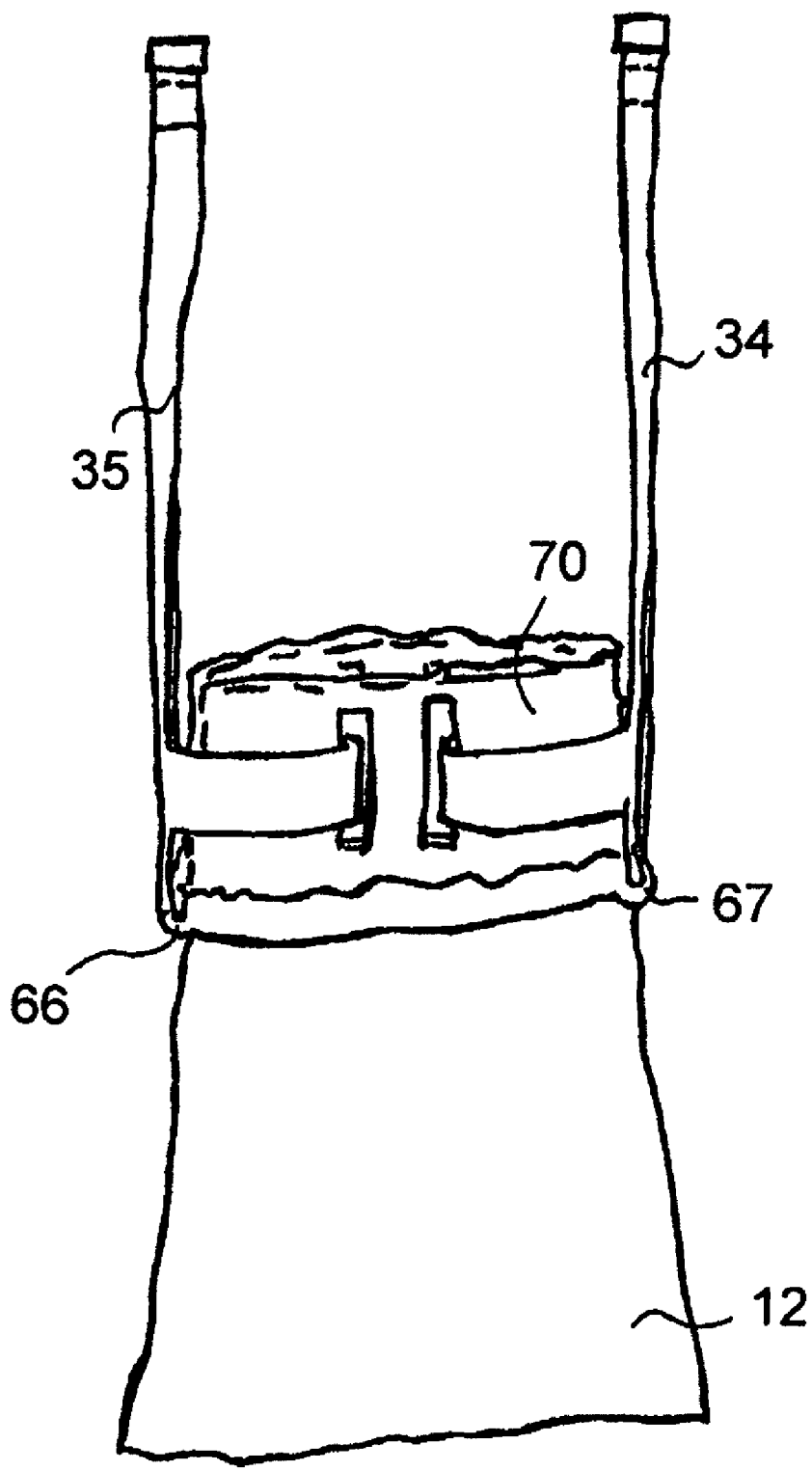

Reference is made to FIGS. 11, 12 and 13, illustrating a partial side view of a receptacle holder of the types illustrated by FIGS. 9 and 10, demonstrating how a plastic bag 12 is to be inserted into the cylindrical member 70. The plastic bag 12 may be inserted from the bottom side of the cylindrical member, or alternatively from the top side of the cylindrical member, then a portion 12a of the plastic bag, near its opening, is folded to enfold the exterior of the cylindrical member 70 as described above, and as shown in FIG. 12. In FIGS. 11, 12 and 13 it is shown that the pivotal connections 66, 67 between the connecting members 34, 35 and the bottom edge of the cylindrical member 70 are made by thickenings in the plastic material from which the cylindrical member and the connecting members are made. It is therefore appreciated that a receptacle-holder including its connecting-members, may be formed altogether from one piece of material, in one casting. It is to be noted however that said parts may be manufactured separately if one so wishes. When manufactured separately, the pivot connection between the cylindrical member and the lower end of the connecting members can be made through either a separate hinge, or a hinge comprising mutually engageable parts, at least one of which is integral to the cylindrical member or to the connecting member.

Figure 14:
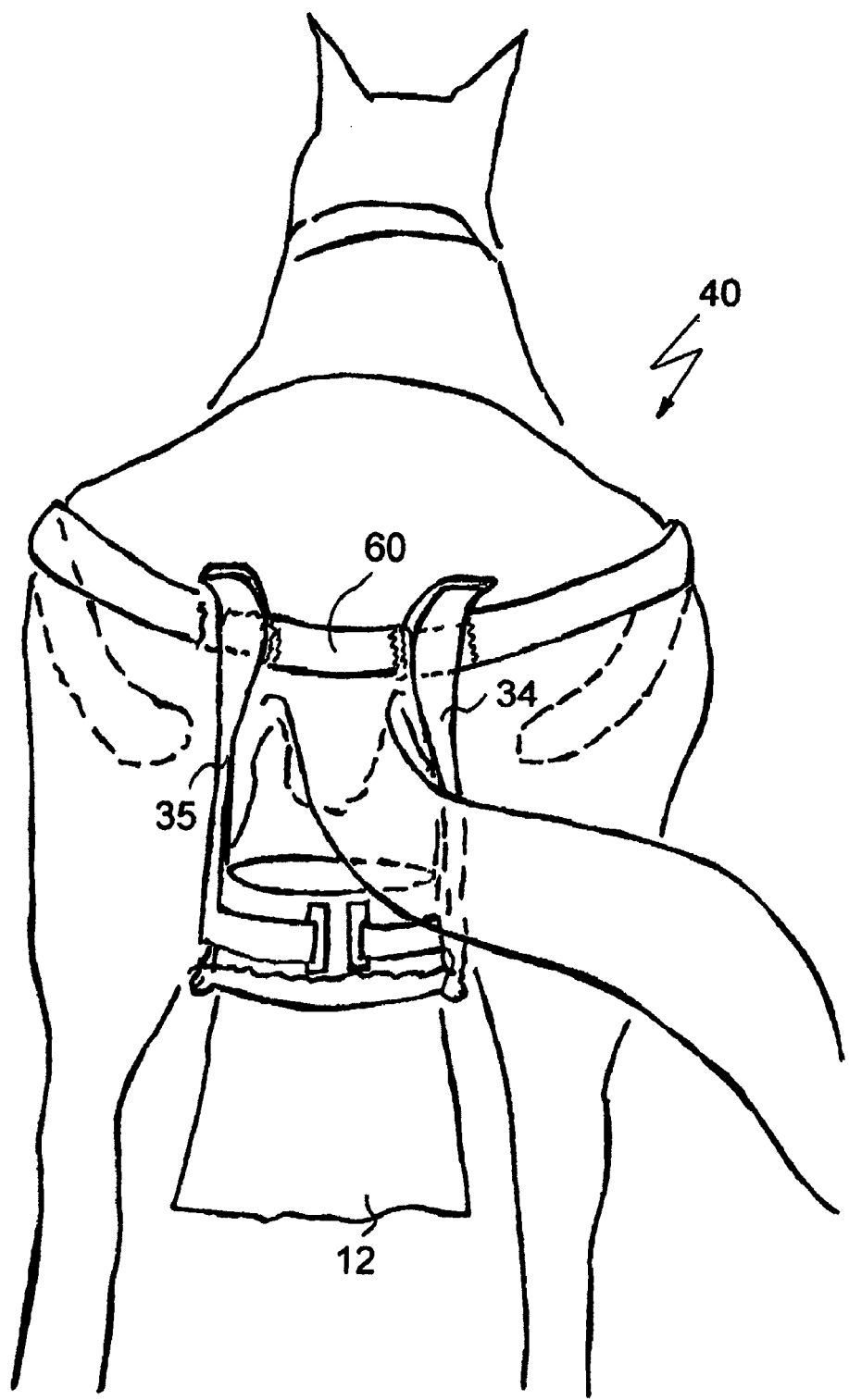
FIGS. 14-15 illustrate, respectively, rear and side views the device of FIG. 9 in position on a quadruped.
Figure 15:
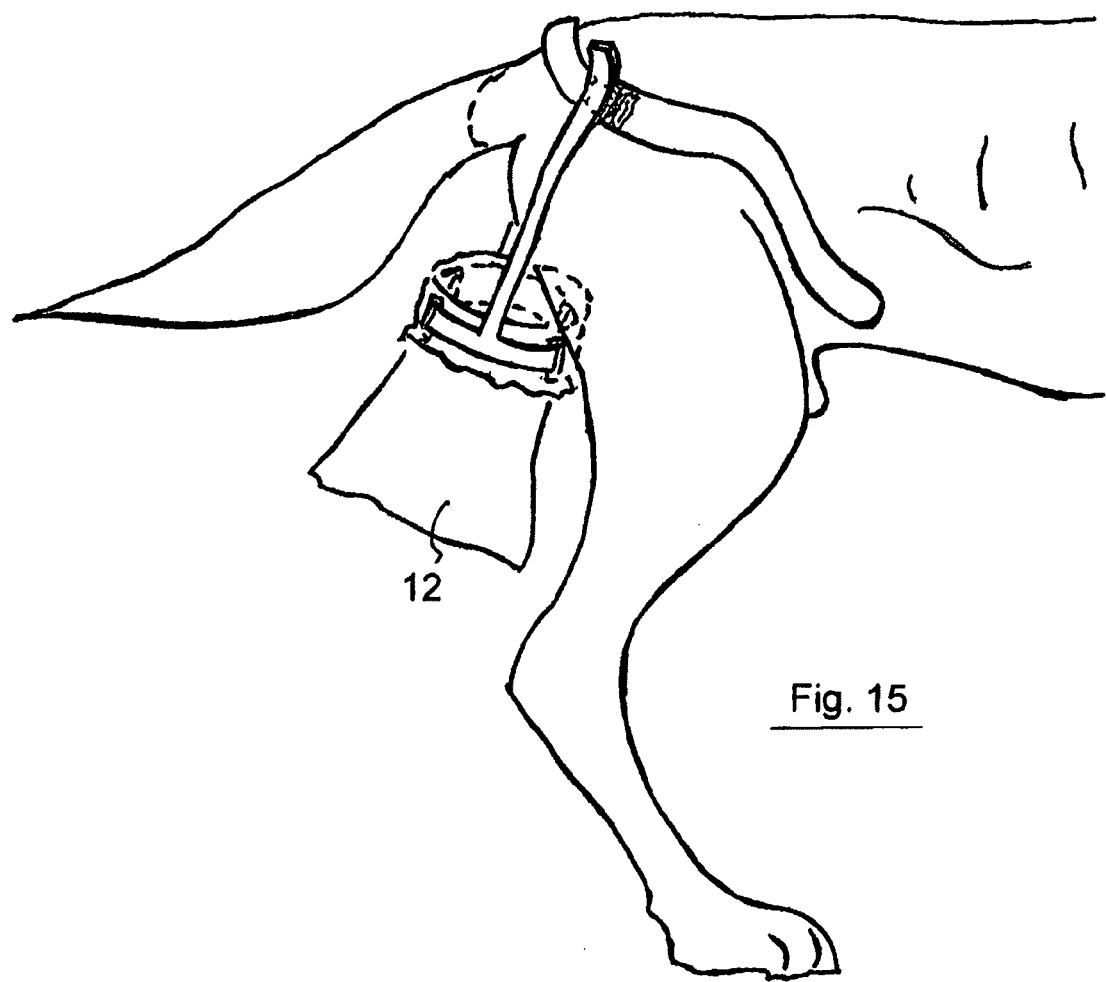

Referring now to FIGS. 14 and 15, the device of FIG. 9 is shown, now in position on a quadruped 40 during its standing or walking. It can be appreciated that the quadruped free to move its tail naturally, due to a sufficiently wide opening provided between the connecting members 34, 35 of the receptacle holder, and due to the fact the receptacle-holder is freely suspended without exerting substantial stress on the animal's organs. It can further be appreciated that in case the quadruped has no tail, the device will function the same way, since the harness bridge 60 is leaning from above the tail bone.

Figure 16:
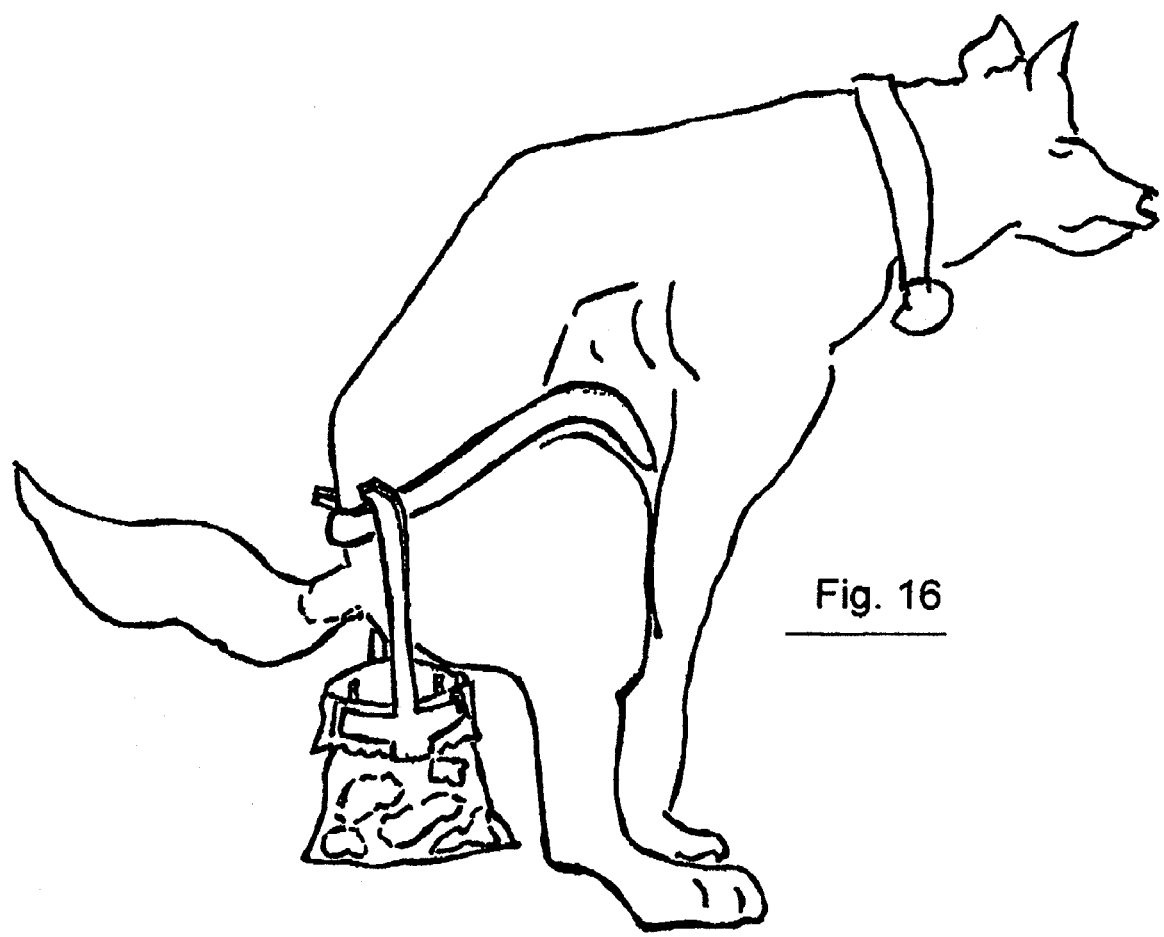
FIG. 16 illustrates the device of FIG. 9 in operative position, when the quadruped takes its customary position to defecate.

FIG. 16 illustrates the device of FIG. 9 in operative position, when the quadruped takes its customary position to defecate. It can be appreciated that while the quadruped changes its position from that of FIG. 15 to this of FIG. 16, the receptacle holder automatically finds the appropriate vertical position for receiving excrement discretion from the quadruped anus, due to the gravity force acting on the receptacle holder, and regardless of its fluctuating former orientation when it was suspended from behind the animal and moving inconsistently as a result of the free activity of the quadruped.

FIG. 17 illustrates how the receptacle can easily be disposed, by simply removing the receptacle holder from the harness (not shown) and separating the connecting members 34, apart from the cylindrical member 70 in the direction indicated by arrows R, respectively, thus releasing the plastic bag 12 from its gripping between the semi-rings 44, 45 and the exterior of the cylindrical member 70, and letting it fall down as indicated by arrows D, into a collection can 77.

The invention claimed is:

1. Excrement catching device for quadruped, comprising a harness and a receptacle-holder,
   wherein the harness is a bridge made of elastic material having
      an U-shaped portion having a rearmost part for positioning above a quadruped's tail bone,
      two side-portions extending from two ends of the U-shaped portion, respectively, such that when said rearmost part is positioned above the quadruped's tailbone, each of the side portions extends along a respective side of the quadruped and is ending near the quadruped's belly just in front of a respective rear leg of the quadruped, and
      two bent portions each extending from the end of one of the side portions and toward the other side portion, wherein said bent portions are ending freely without an underbody portion connecting between them,
   wherein
      the U-shaped portion is substantially flat and located in a first vertical plane, the two side portions are both located in a second plane angled forward relative to the first plane, and
      the two bent portions are both located in a third plane angled relative to the second plane.

2. Excrement catching device according to claim 1, wherein the bent portions are arched.

3. Excrement catching device according to claim 1, wherein the length of the side portions is telescopically adjustable.

4. Excrement catching device according to claim 1, further comprising
   a pair of rods for suspending the receptacle holder, said rods being removably connectable to the bridge adjacently to the U-shaped portion and remotely from the bent portions, such that when the rearmost part is positioned above a quadruped's tail bone and the bent portions are positioned respectively in front of the quadruped's rear legs, said rods are in an upright orientation and are oriented substantially perpendicularly to the plane in which the U-shaped portion is located.

5. Excrement catching device according to claim 1, wherein
   when the U-shaped portion is oriented in a horizontal first plane for positioning above a quadruped's tail bone, the side portions extend downward, obliquely relative to the horizontal first plane, obliquely relative to a vertical plane and toward the quadruped's head.

6. Excrement catching device according to claim 1, further comprising:
   a pair of rods for suspending the receptacle holder, said rods being removably connectable, in an upright orientation, to a middle part of the U-shaped portion;
   wherein
   each of said rods is pivotably attached to the receptacle holder to be rotationally moveable between the upright orientation and a non-upright orientation;
   each of said rods has a clamping member engageable with the receptacle holder, when the respective rod is in the upright orientation, to hold an excrement receiving bag between said clamping member and the receptacle holder; and
   said clamping member is disengageable from the receptacle holder, when the respective rod is in the non-upright orientation, to release the excrement receiving bag from said excrement catching device.

7. Excrement catching device according to claim 1, wherein the first and third planes are substantially perpendicular to the second plane.

8. Excrement catching device for quadruped, comprising a harness, a receptacle-holder, and a pair of rods for suspending the receptacle holder,
wherein
the harness is a bridge made of elastic material having
an U-shaped portion, and
two side-portions extending from two ends of the U-shaped portion, respectively, wherein said side portions are ending freely without an underbody portion connecting between them, and are angled relative to a plane of the U-shaped portion;
said rods are removably connectable, in an upright orientation, to a middle part of the U-shaped portion;
each of said rods is pivotably attached to the receptacle holder to be rotationally moveable between the upright orientation and a non-upright orientation;
each of said rods has a clamping member engageable with the receptacle holder, when the respective rod is in the upright orientation, to hold an excrement receiving bag between said clamping member and the receptacle holder; and
said clamping member is disengageable from the receptacle holder, when the respective rod is in the non-upright orientation, to release the excrement receiving bag from said excrement catching device.

9. Excrement catching device according to claim 8, wherein
the clamping member of each of said rods has a shape conforming to a shape of said receptacle holder, thereby enabling the excrement receiving bag to be held between the conforming shapes of the clamping member and the receptacle holder when the respective rod is in the upright orientation.

10. Excrement catching device according to claim 8, wherein
each of said rods is pivotably attached to a lower part of the receptacle holder.

11. Excrement catching device according to claim 8, wherein
the clamping member of each of said rods has a first locking member, and
the receptacle holder has a second locking member engageable with the first locking member for engaging said clamping member with said receptacle holder when the respective rod is in the upright orientation.

12. Excrement catching device according to claim 8, wherein
the clamping member of each of said rods is a semi-ring; and
the receptacle holder is cylindrical.

13. Excrement catching device according to claim 12, wherein
each of said rods is pivotably attached to a bottom of the receptacle holder.

14. Excrement catching device according to claim 13, wherein
the clamping member of each of said rods has a tongue detachably engageable with a groove in the receptacle holder when the respective rod is in the upright orientation.

15. Excrement catching device according to claim 8, wherein the length of the hardness is telescopically adjustable.

16. Excrement catching device according to claim 8, wherein
the U-shaped portion is substantially flat and located in a first plane, and when the U-shaped portion is oriented in a horizontal first plane for positioning a rearmost part of the U-shaped portion above a quadruped's tail bone, the side portions extend downward, obliquely relative to the horizontal first plane, and obliquely relative to a vertical plane toward the quadruped's head.

17. Excrement catching device for quadruped, comprising a harness and a receptacle-holder,
wherein the harness is a bridge made of elastic material having
an U-shaped portion having a rearmost part for positioning above a quadruped's tail bone, and
two side-portions extending from two ends of the U-shaped portion, respectively, such that when said rearmost part is positioned above the quadruped's tailbone, each of the side portions extends along a respective side of the quadruped and is ending near the quadruped's belly just in front of a respective rear leg of the quadruped;
wherein
said side portions are ending freely without an underbody portion connecting between them,
the U-shaped portion is substantially flat and located in a vertical plane, and the side portions extend obliquely out of said vertical plane.

18. Excrement catching device according to claim 17, wherein
said side portions are ending at respective free ends that are closer to each other than the two ends of the U-shaped portion from which the side portions extend.

19. Excrement catching device according to claim 18, further comprising:
a pair of rods for suspending the receptacle holder, said rods being removably connectable, in an upright orientation, to a middle part of the U-shaped portion;
wherein
each of said rods is pivotably attached to the receptacle holder to be rotationally moveable between the upright orientation and a non-upright orientation;
each of said rods has a clamping member engageable with the receptacle holder, when the respective rod is in the upright orientation, to hold an excrement receiving bag between said clamping member and the receptacle holder; and
said clamping member is disengageable from the receptacle holder, when the respective rod is in the non-upright orientation, to release the excrement receiving bag from said excrement catching device.

20. Excrement catching device according to claim 17, further comprising:
a pair of rods for suspending the receptacle holder, said rods being removably connectable, in an upright orientation, to a middle part of the U-shaped portion;
wherein
each of said rods is pivotably attached to the receptacle holder to be rotationally moveable between the upright orientation and a non-upright orientation;
each of said rods has a clamping member engageable with the receptacle holder, when the respective rod is in the upright orientation, to hold an excrement receiving bag between said clamping member and the receptacle holder; and
said clamping member is disengageable from the receptacle holder, when the respective rod is in the non-upright orientation, to release the excrement receiving bag from said excrement catching device.

21. Excrement catching device according to claim 17, wherein
> when the plane of the U-shaped portion is horizontal with the rearmost part of the U-shaped portion positioned above the quadruped's tail bone, the side portions extend downward, obliquely relative to said plane, obliquely relative to the vertical plane and toward the quadruped's head.

* * * * *